United States Patent Office 3,799,940
Patented Mar. 26, 1974

3,799,940
PROCESS FOR PRODUCING AROMATIC ALDEHYDES
Harold E. Mains, Cincinnati, Ohio, assignor to Emery Industries, Inc., Cincinnati, Ohio
No Drawing. Continuation-in-part of abandoned application Ser. No. 857,576, Sept. 12, 1969. This application Dec. 16, 1971, Ser. No. 208,734
Int. Cl. C07c 47/48, 47/54
U.S. Cl. 260—340.5                 10 Claims

ABSTRACT OF THE DISCLOSURE

A novel process for producing aromatic aldehydes and their stable precursors comprising ozonizing an aryl alkene at a temperature of from about 0 to 45° C. to produce an aromatic alkyl ozonide; treating the aromatic alkyl ozonide with an alkali metal, alkaline earth metal, or ammonium bisulfite at a temperature of from about 0° C. to 20° C. to form a solid adduct; and optionally, treating the solid adduct with an alkali metal base to liberate the aromatic aldehyde.

CROSS REFERENCES

This is a continuation-in-part of my copending application Ser. No. 857,576, filed Sept. 12, 1969, now abandoned.

BACKGROUND OF THE INVENTION (1) Field of invention

This invention relates to the field of ozonization and more particularly to the ozonization of aryl alkenes to produce aromatic aldehydes.

(2) prior art

Ozonization processes for producing aromatic aldehydes are known in the art. However, these processes have certain disadvantages which have heretofore limited their practical application. For example, several methods require the use of reactive and/or volatile solvents which present serious separation, safety, and low temperature operation problems.

Another disadvantage of prior art methods is that they directly produce the aldehyde and since the aromatic aldehydes are highly unstable severe product storage and transportation problems exist. Since the aromatic aldehydes find widespread use in perfumes, storage ability or oxidative stability are of critical importance to ensure that malodorous compounds are not produced.

In addition, these known methods do not produce as high a yield of aromatic aldehydes as desired.

In contrast to the disadvantages of the prior art processes, we have now found that aromatic aldehydes and their stable precursors may be economically and easily prepared by the critical selection of the ozonization solvent, the ozonide decomposition method and the temperature of the ozonide decomposition-adduction reaction.

Surprisingly, the aromatic aldehydes and their stable precursors can be prepared in high yields without the necessity of volatile and difficulty separable solvents or the application of expensive low temperature processing.

SUMMARY OF THE INVENTION

Aromatic aldehydes and their stable precursors are prepared by a novel process comprising ozonizing an aryl alkene at a temperature of from about 0 to 40° C. and employing a $C_5$ to $C_{10}$ fatty acid solvent to produce an aromatic alkyl ozonide; treating the aromatic alkyl ozonide with an alkali metal or alkaline earth metal bisulfite at temperatures of from about 0° C. to 20° C. to give a stable solid adduct precursor; and recovering the precursor or optionally treating it with an alkali metal base to produce the aromatic aldehyde.

DESCRIPTION OF THE INVENTION

Suitable aryl alkenes which may be converted to aromatic aldehydes in accordance with the present invention include compounds of the following strctural formula:

$$Ar(CH_2)_n-C=C\begin{subarray}{l}R_2\\R_4\end{subarray}\begin{subarray}{l}\\R_3\end{subarray}$$

wherein Ar is a mono- or polynuclear aromatic or substituted aromatic ring, $n$ is an integer from 0 to 3, $R_2$, $R_3$ and $R_4$ are aliphatic radicals containing from 1 to 4 carbon atoms or hydrogen, provided that neither $R_4$, Ar, $R_2$, or $R_3$ may contain any radical moieties which are more reactive to ozone at the reaction conditions or which would hinder the formation of, or are incapable of reacting with the metal bisulfite to form the adduct. Preferably, the aromatic component is mononuclear and $R_4$ and $R_2$ or $R_3$ is hydrogen. Examples of compounds within the aforementioned class include, but are not limited to, the following: anethole, styrene, isosafrole, methyl styrene and divinyl benzene. The present process is especially useful with anethole, isosafrole and styrene.

Ozonization of the aryl alkenes may be conducted in accordance with suitable ozonization methods as known in the art. The ozone may be conveniently utilized in ozone-oxygen mixtures in concentrations of from about .5 to 10% by weight of ozone per 99.5 to 90% of oxygen and preferably about 3 to 6% by weight of ozone per 97 to 94% of oxygen. Often the available ozone-oxygen mixtures may contain minor amounts of impurities such as nitrogen compounds, etc.

Since excess ozone will yield undesirable products, the ozone supplied to the reaction should approximate the theoretical amount required to convert the aryl alkenes to aldehydes. In addition, the reaction may be monitored by measuring for the presence of ozone in the reaction exhaust gases.

The fatty acid solvent used for dissolving the aryl alkene may be selected from those fatty acids containing from 5 to about 10 carbon atoms. Preferably, the fatty acid solvent contains about 7 to 9 carbon atoms and most preferably the fatty acid is pelargonic acid. The solvent is employed in quantities sufficient to dissolve the aryl alkenes; generally in the range of 1 part of aryl alkenes per 1 to 3 parts of fatty acid solvent.

In general, fatty acids containing 3 or less carbon atoms are too volatile in the presence of ozone-oxygen mixtures to be utilized at temperatures above 0° C. without explosion hazards. One particular advantage of utilizing the $C_5$–$C_{10}$ short chain fatty acid solvents is that they allow operation of the ozonization reaction at desirable temperature levels, i.e., within the range of about 0 to 45° C. and preferably from about 10 to 40° C. Utilization of these moderate temperatures eliminates the need for high-cost, low-temperature refrigeration equipment previously required in conducting ozonization reactions of this type. Also, much improved yields are obtained by the process of this invention.

The aromatic alkyl ozonides produced in the ozonization reaction are reacted with an aqueous solution of an alkali metal, alkaline earth metal, or ammonium bisulfite to produce a stable adduct. Suitable metal salts within the above class include the following: bisulfites of sodium, potassium, calcium, barium, strontium, and magnesium. Preferably, however, the metal bisulfite is sodium or potassium bisulfite.

Generally, a sufficient amount of metal bisulfite will range from about 1.0 to 3.0 moles per mole of ozonized aryl alkene present in the ozonization reaction. Preferably, the amount will range from 2 to 2.5 moles of metal bisulfite per mole of aryl alkene ozonized. The solid adduct is removed from the solution by filtering or by other desirable means. The adduct in this form may be shipped and/or stored; or if the aldehyde is desired, the adduct can be converted by treating with suitable base materials. Although acids can be used to liberate the aldehyde they are undesirable because they produce corrosive by-products and are more difficult and expensive to handle.

The temperature of the adduct formation was found to be critical within a range of about 0 to 40° C. and preferably 0 to 20° C. Operation at temperatures above 40° C. resulted in the formation of a low yield of a yellow slimey product which was difficult to filter and recover. When the reaction was conducted in the 0–20° C. range a white crystalline solid product which filtered easily was obtained.

Satisfactory control of the reaction temperature within the foregoing delineated ranges was obtained by the simultaneous addition of the ozonide and the metal bisulfite.

Since the aromatic aldehydes are known to decompose upon reaction with oxygen in storage or on standing, one particular advantage of the present invention is to provide a stable adduct precursor which can be stored for long periods and conveniently converted to the aldehyde at the point of application when desired. Suitable reactants for converting the adducts to aldehydes include alkali metal or alkaline earth metal oxides, hydroxides and carbonates of sodium, potassium, calcium, magnesium, barium, strontium, and the ammonium hydroxides and carbonates.

The following examples are intended as merely illustrative of the process of the present invention and in no way whatsoever intended to limit the scope of the claims attached hereto.

EXAMPLE 1

19.6 grams of anethole was dissolved in 72 grams of pelargonic acid and ozonized in a glass tubular reactor (4 cm. x 34 cm.) at a temperature of about 3° C. to 10.5° C. until ozone was detected in the exit gases (KI-Starch Trap method). The ozonator was set to deliver approximately 28 grams of $O_3$ per hour, at a rating of 0.2 CFM of $O_2$–$O_3$ at 7 amps and 8 p.s.i. of $O_2$ pressure. The ozonide formed was added dropwise to a cold reaction flask simultaneously with .3 mole and a saturated aqueous solution of sodium bisulfite and the reaction was maintained in an ice bath at a temperature of 0° C. Upon completion of addition, the mixture was stirred for approximately 1 hour and a solid p-anisaldehyde-sodium bisulfite adduct was isolated by filtration. The adduct was washed with methanol, ether and air-dried to give 33 grams of a white crystalline product.

EXAMPLE 2

A portion of dried adduct (19 g.) of Example 1 was shaken with 20 ml. of a 5% solution of sodium hydroxide in the presence of ether, and the ether solution was distilled to give 7.7 grams of p-anisaldehyde as determined by GLC.

EXAMPLES 3–6

Additional ozonizations of anethole were carried out and the results are presented in Table 1.

TABLE I.—OZONOLYSIS OF ANETHOLE

| Example | Anethole (ml.) | Pelargonic acid (ml.) | Ozzonitation emp., ° C. | Yield of p-anisaldehyde from adduct (percent of theory) | | Yield of p-anisaldehyde from reworking solvent,[1] percent | Total Yield of Crude p-anisaldehyde, percent |
|---|---|---|---|---|---|---|---|
| 3 | [2] 200 | 400 | 18–30 | 55.4 | Distillate | | |
| 4 | [3] 200 | 600 | 15–27 | 75.2 | Distillate [4] | 14.3 | |
| 5 | 200 | 600 | 7–14 | 72.5 | Distillate | 95 | 83.6 |
|  |  |  |  | 1.6 | Residue | | |
| Average |  |  |  | 74.1 |  | | |
| 6 | 150 | 450 | 28–36 | 77.0 | Distillate [5] | 8.5 | 85.9 |
|  |  |  |  | 4.0 | Residue | | |
| Total |  |  |  | 81.0 | | | |

[1] Additional p-anisaldehyde was obtained by extracting the filtrate from the adduct filtration (mainly pelargonic acid) with aqueous $NaHSO_3$. Treating the $NaHSO_3$ washes with caustic liberated additional aldehyde.
[2] The oxonide was added directly to $NaHSO_3$ and the temperature of reaction was allowed to reach 50° C. The adduct obtained was a slimey yellow mass that would not filter.
[3] In this and the following example the ozonide was added to a cooled flask simultaneously with the $NaHSO_3$.
[4] The bisulfite adduct was washed with methanol, ether and air-dried.
[5] GLC analysis indicates the p-anisaldehyde is +99% pure.

At various temperatures the ozonization step was accompanied by a potentially dangerous explosive mist or fog forming above the reactant solution. It was found that severity of fogging was related to the temperature at which the ozonization was carried out. No visual fogging was observed at temperatures of from about 0° C. up to approximately 20° C.; above 30° C. the fog becomes prominent.

EXAMPLE 7

The procedure of Example 1 was followed except that isosafrole was substituted for anethole. A white crystalline adduct was obtained. The adduct was then treated with sodium hydroxide solution to produce piperonal, also known as heliotropine.

EXAMPLE 8

The procedure of Example 1 was followed except that styrene was substituted for anethole. A white crystalline adduct was obtained. The adduct was then treated with sodium hydroxide solution to produce benzaldehyde.

EXAMPLE 9

To demonstrate the advantage of the present invention which employs $C_5$ to $C_{10}$ fatty acid solvents comparative runs were conducted employing methanol, acetic acid and propionic acid as the solvents. The experiments were conducted employing identical reaction conditions and reaction temperatures (15–20° C.) for the ozonization. The results are set forth below in Table II and it is seen that excellent yields of aldehydes were obtained when pelargonic acid was employed.

TABLE II

| Run No. | Aryl alkene ozonized (0.134 mol) | Solvent (80 ml.) | Percent yield [1] | Volatile materials [2] |
|---|---|---|---|---|
| A | Anethole | Methanol | 7.3 | 17.0 |
| B | do | Acetic acid | 53.2 | 3.9 |
| C | do | Propionic acid | 42.2 | 0.5 |
| D | do | Pelargonic acid | 75.7 | 0.5 |
| E | Isosafrole | do | 91.7 | Nil |

[1] Based on ozone consumed by reaction mixture (reaction terminated when ozone was detected in the exit gases).
[2] Material which was condensed from the exit gases in a Dry-Ice trap.

From the data presented in the table it is evident that methanol is unsuitable as a solvent at moderate to ambient temperatures since the yield of aldehyde is very low. 1.5 mols ozone per mol of olefin were consumed in Run A indicating a considerable amount of methanol had reacted with the ozone. The use of low molecular weight acids such as acetic and propionic acids also resulted in poor yields of the aldehyde product. The reason for the poor performance of the $C_2$–$C_4$ acids is not definitely known, however, it could be related to the solubilities and/or acidities of these acids. In any event, ozonizations conducted with the pelargonic acid gave much superior yields with a decrease in volatile materials evolved as compared to ozonizations employing methanol, acetic acid and propionic acid as the solvents.

As will be evident to those skilled in the art, various modifications of the present invention can be made and followed in the light of the foregoing disclosure and discussion, without departing from the spirit or scope of the following claims.

I claim:

1. A process for preparing stable aldehyde precursor adducts aromatic aldehydes by the ozonization of aryl alkenes comprising the steps of:
   (a) ozonizing an aryl alkene selected from the group consisting of anethole, styrene, isoafrole, methyl styrene and divinyl benzene containing at a temperature from 0 to 45° C. in a fatty acid solvent having from 5 to 10 carbon atoms to produce an aromatic alkyl ozonide; and
   (b) treating the aromatic alkyl ozonide at a temperature from about 0 to 40° C. with an aqueous solution of an alkali metal bisulfite, alkaline earth metal bisulfite or ammonium bisulfite sufficient to furnish about 1 to 3 mols of metal bisulfite per mole of the ozonized aryl alkene to form the solid adduct.

2. The process of claim 1 wherein the solvent is a fatty acid having from 7 to 9 carbon atoms.

3. The process of claim 2 wherein the ozonization is conducted at a temperature from about 10 to 40° C. and the bisulfite treatment of the aromatic alkyl ozonide is conducted at a temperature from about 0 to 20° C.

4. The process of claim 3 wherein the aryl alkene is anethole.

5. The process of claim 4 wherein 1 to 3 parts by weight pelargonic acid per weight part aryl alkene is employed as the fatty acid solvent.

6. The process of claim 5 wherein the alkali metal bisulfite is selected from the group consisting of sodium bisulfite and potassium bisulfite.

7. The process of claim 1 wherein the solid adduct reaction product is treated with an alkali metal base to liberate the aromatic aldehyde.

8. The process of claim 7 wherein 1 to 3 weight parts of fatty acid solvent having 7 to 9 carbon atoms are employed per part aryl alkene, the ozonization is conducted at a temperature from 10 to 40° C., and the aromatic alkyl ozonized is treated at a temperature from about 0 to 20° C. with 1 to 3 mols sodium bisulfite or potassium bisulfite per mol of the ozonized aryl alkylene to form the solid adduct reaction product.

9. The process of claim 8 wherein the aryl alkene is anethole.

10. The process of claim 9 wherein the fatty acid solvent is pelargonic acid.

No references cited.

DONALD G. DAUS, Primary Examiner

J. H. TURNIPSEED, Assistant Examiner

U.S. Cl. X.R.

260—599, 600